June 1, 1926.  
S. OTIS ET AL  
1,587,349  
SEED HARVESTING MACHINE  
Filed March 12, 1921  
3 Sheets-Sheet 1

Witness:  
R. Burkhardt

Inventors:  
Spenser Otis and  
Spencer Otis Jr.  
By Wilkinson, Huxley, Byron & Knight  
attys June 1, 1926.
S. OTIS ET AL
1,587,349
SEED HARVESTING MACHINE
Filed March 12, 1921   3 Sheets-Sheet 2
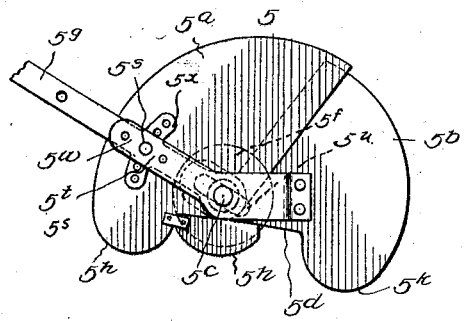
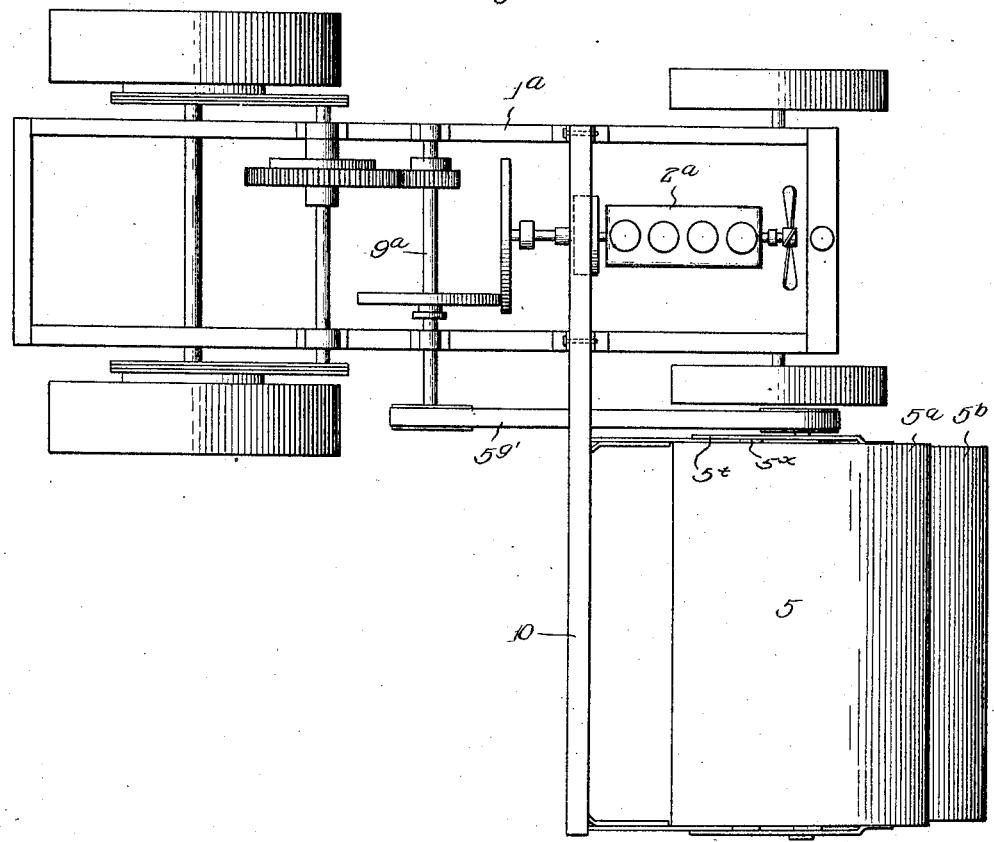
Witness:
R. Burkhardt.
Inventors:
Spencer Otis and
Spencer Otis Jr.
By Wilkinson, Huxley, Byron & Knight, attys.

June 1, 1926.
S. OTIS ET AL
1,587,349
SEED HARVESTING MACHINE
Filed March 12, 1921   3 Sheets-Sheet 3
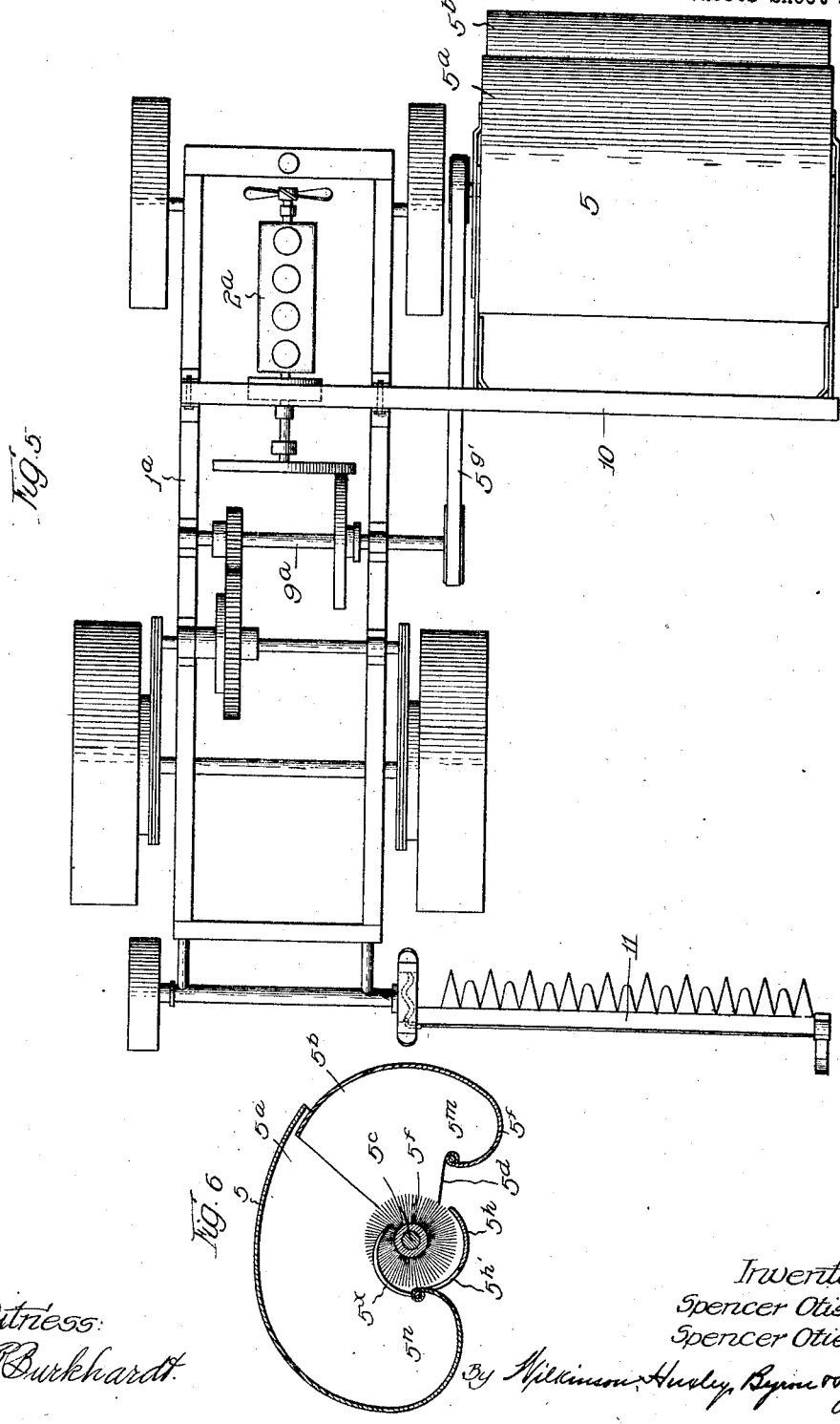

Patented June 1, 1926.

1,587,349

UNITED STATES PATENT OFFICE.

SPENCER OTIS, OF CHICAGO, AND SPENCER OTIS, JR., OF BARRINGTON, ILLINOIS.

SEED-HARVESTING MACHINE.

Application filed March 12, 1921. Serial No. 451,781.

This invention relates to a machine for harvesting seed from standing vegetation, and has for one of its objects to provide efficient means for dislodging and collecting seed from standing plants without injuring the plant or unripened seed.

The invention has for a further object to provide means for harvesting the seed and plants of forage vegetation simultaneously but separately, and in a manner to cause the seed or the available ripened portion thereof to be recovered and collected in advance of the cutting of the plant, and to have the seed harvesting and reaping apparatus propelled by one and the same vehicle.

The portion of the invention which relates to harvesting seed proceeds upon the principle of intruding the seed-bearing portions of standing plants into the path of a sweeper, preferably a bristled brush, which is so encased that the dislodged seed will be trapped and accumulated in a seed pocket or pockets, the sweeper being preferably adapted to act upon the plants by the air current which it generates as well as by impingement against the plants. Accordingly, this portion of the invention consists in providing upon a suitable traveling vehicle a hood constructed with a downwardly presented throat, at one side of which and having its lower sector shielded against plant contact, is located the sweeper, while the hood at the other side of the throat is constructed to ride over the plants but permit them to rise up under their own resiliency and intrude their seed-bearing portions through the throat where they are temporarily sustained in the path of the sweeper and against the impingement and air blast of the latter; the shield being limited to a sector of the sweeper which is at a substantial angle below the horizontal diameter of the sweeper, so that the direction in which the sweeper acts against the intruded heads of the plants has a substantial horizontal as well as an upward component, but in a direction which safely delivers the dislodged seed within the hood; and the shielding of the lower sector of the sweeper preventing action of the sweeper against the plants over which it rides at any angle which would waste the dislodged seed.

To adapt the machine to accomplish the object of harvesting the seed and reaping the plant simultaneously but separately, any suitable construction of harvester is mounted upon the vehicle or connected to be towed thereby, so that it will follow the seed harvester in the area which it traverses.

In the preferred embodiment of the device, the hood is made with a double clamshell construction, the members of which are spaced apart at bottom to provide the aforesaid throat, and preferably spaced apart at top as well to provide a vent for the air current set up by the sweeper, it being overlapped at the vent so that any seed borne up upon the air current will be deflected past the vent and caused to precipitate in rear of the brush; and the hood with its contained sweeper is mounted through the medium of means which permits it to be raised and lowered to position where it will act upon plants of different height, the specific elevating means consisting preferably of radius arms, between which the hood is mounted, and the members of the hood being angularly adjustable about the axis of the sweeper so that the proper presentation of the throat can be insured at different elevations of the hood. To adapt the apparatus to harvest the plant immediately after recovering the seed therefrom, the plant harvester is connected in tow to the vehicle which propels the seed harvester.

In the accompanying drawings—

Figure 3 is a side elevation of the seed harvester.

Figure 4 is a plan view showing the preferred method of combining the subject-matter of the present invention with a tractor.

Figure 5 represents a combined seed and plant harvesting apparatus embodying the present invention.

Figure 6 is a sectional view of the seed harvester equipped for harvesting cotton.

1 represents a vehicle having suitable means of propulsion, such, for instance, as attaching means 2 for draft animals, ground wheels 3 upon which the load of the machine is mainly supported, and trailing wheels 4 which are preferably of caster type.

The seed harvesting mechanism comprises a hood 5 preferably of approximately clamshell construction and comprising members 5ª, 5ᵇ, pivotally connected upon an axis 5ᶜ, spaced apart at bottom to leave between them a downwardly presented throat 5$^d$ into which the seed-bearing portion of the plants will be constantly intruded as the hood rides over them, and preferably spaced apart also at top to provide a vent 5$^e$. On the rear side of the throat 5$^d$ the hood is provided with a sweeper 5$^f$ driven by any suitable means, for instance, the belts 5$^g$, in a direction to cause it to act by sweeping impingement, and preferably also by generated air current across the throat 5$^d$. A concave 5$^h$ substantially conforming to the sweeper adapts it to generate the air current. In rear of the throat 5$^d$, said concave is provided with an air inlet 5$^{h'}$ to prevent suction outward from the interior of the hood.

The shell has a plant depressing portion 5$^k$ which rides over the plants so that they rise up and intrude their seed-bearing portions into the throat 5$^d$ as the hood progresses. Within the depressed portion 5$^k$ is a seed receptacle 5$^m$, and behind the sweeper 5$^f$ may be located an auxiliary seed receptacle 5$^n$.

Figure 1:
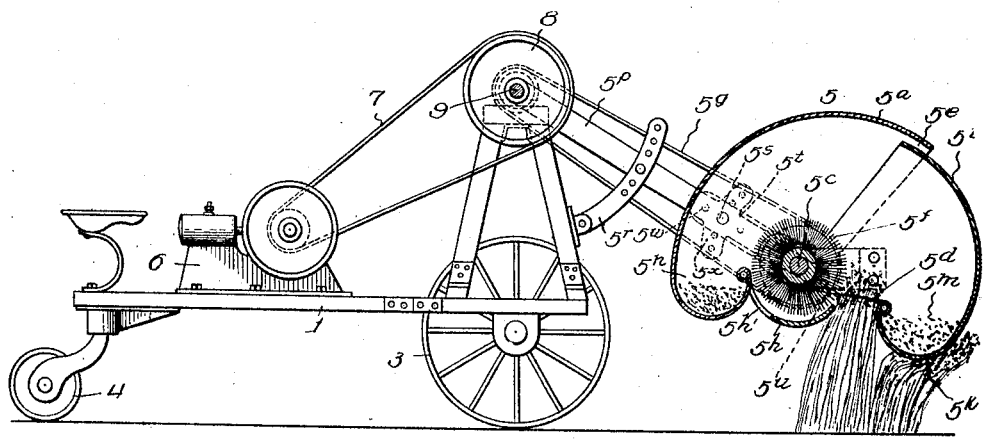
Figure 1 is a side elevation with the hood in section.
Figure 2:
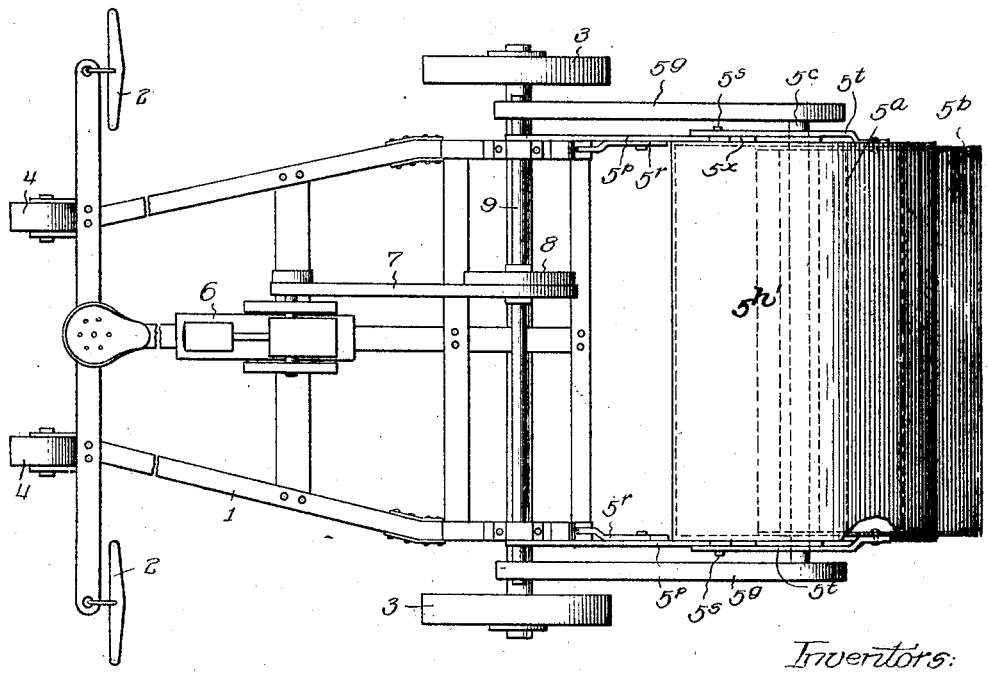
Figure 2 is a plan view of a seed harvesting machine embodying the several features of the invention.

The hood 5 is mounted on the vehicle 1 with means for changing its elevation so as to adapt the hood to harvest the seed from plants of different heights. This is preferably accomplished by means of the radius arms 5$^p$ adjustable through the medium of the supporting arms 5$^r$. Inasmuch as the shifting of the elevation of the hood through the medium of radius arms also tends to change its angle and disarrange the presentation of the throat 5$^d$ as well as to exaggerate or diminish the relative depression of the plant-depressing swell 5$^k$, the member 5$^b$ of the hood is angularly adjustable upon the member 5$^a$ thereof through the medium of the pivotal connection 5$^c$, as aforesaid, and this adjustment is held through the medium of securing bolt 5$^s$ passing through an arm 5$^t$ that is rigid with hood member 5$^b$, and engaging in any of a series of holes made through a segment 5$^x$ carried by radius arm 5$^p$. The member 5$^b$ of the hood has a further adjustment in the direction to regulate the width of the throat 5$^d$, and this is accomplished by providing a slot 5$^u$ in its arm 5$^t$ and multiplying the perforations 5$^w$ longitudinally of the arm 5$^t$, so that the bolt 5$^s$ can be shifted in arm 5$^t$ and member 5$^b$ can be secured at a plurality of different spacing adjustments relatively to the member 5$^a$ and still leave it angularly adjustable through means of the perforations in segment 5$^x$. The releasable connection, consisting of bolt 5$^s$ passing through arm 5$^t$ and segment 5$^x$, may serve an additional purpose, in that by releasing such connection, hood member 5$^b$ can swing to the right in Figures 1 and 3 until the hood is fully opened up and the gathered seed thereby exposed for convenient removal.

The sweeper 5$^f$ will preferably be driven independently of the progress of the machine over the ground, and to this end, any suitable form of motive power, typified by the motor 6 and connected through belt 7, fast and loose pulleys 8 and shaft 9 with the belts 5$^g$ heretofore referred to, may be provided.

If the seed harvester is to be mounted upon an automotive vehicle, for instance, a tractor 1$^a$ having a propelling engine 2$^a$ with power shaft 9$^a$ driving the belt 5$^{g'}$, the harvester will preferably be supported by an outrigger arm 10 extending laterally from the tractor 1$^a$ in position to support the seed harvester.

If the machine is to be employed for mowing the plant simultaneously with or immediately following the harvesting of the seed, any known type of mowing machine 11 will be connected in tow of the tractor 1$^a$, as suggested in Figure 5. There is a special advantage in mowing the plant immediately after it has been subjected to the seed harvesting process, because at that time all the ripe or easily deposited seed will have been taken off the plant and the seed that remains thereon will be in condition to remain with the harvested plant for removal therefrom by any method now practiced. Moreover, the percentage of downtrodden plants will be greatly lessened if the mowing can be accomplished simultaneously with the seed harvesting, and wastage will be correspondingly reduced. In this arrangement, preferably both the seed harvester and mower are sustained by outriggers from one side of the tractor in order that the tractor may run upon a surface that has already been treated.

As suggested in Figure 6, the harvester herein described may be provided with a comb or stripping teeth 5$^x$ located in position to disengage from the bristles of the sweep any material adhering thereto and cause the same to be deposited to the rear in the receptacle 5$^n$. This adapts the device for use in harvesting fibrous material, such as cotton, or seeds surrounded by fiber. Obviously, the rear receptacle 5$^n$ can be made of ample capacity to hold any particular character of material that may be harvested.

The cleaning fingers 5$^x$ may be useful in cleaning the bristles of the sweep of other kinds of harvested seed, but it will ordinarily not be necessary as it is found in practice that when the sweep revolves at about five hundred revolutions per minute, which is found to be efficient, the seed will be thrown off and the brush kept clean by centrifugal force.

We claim:

1. In a machine for harvesting seed from standing vegetation, a vehicle adapted to be propelled against the vegetation, a revoluble sweep supported on said vehicle in position to impinge against the seed-bearing portion of the vegetation and in an upward direction, and a hood on said vehicle forward of said sweep and having a substantially cylindrical under surface adapted to first depress the plants and then permit them to rise in front of the sweep.

2. In a machine for separating ripe seed from unripe seed on standing vegetation, a vehicle adapted to move continuously forward against the vegetation, a hood mounted on said machine constructed with a plant-depressing portion, a downwardly presented throat immediately in rear of said portion, a sweeper shield immediately in rear of said throat, and a sweeper mounted immediately above said shield, in position to present a substantial sector of its circumference against the heads of vegetation intruded through the throat, in a direction largely horizontal but above the opposite wall of the throat.

3. In a machine for separating ripe seed from unripe seed on standing vegetation, a vehicle adapted to be propelled against the vegetation, a hood mounted on said machine constructed with a plant-depressing portion, a downwardly presented throat immediately in rear of said portion, a sweeper shield immediately in rear of said throat, and a sweeper mounted immediately above said shield, in position to present a substantial sector of its circumference against the heads of vegetation intruded through the throat; the shield being limited circumferentially to a lower sector of the sweeper that is substantially below its horizontal diameter, whereby the sweeper acts against the heads of the plants in a forward and upward direction.

4. In a machine for harvesting seed from standing vegetation, a vehicle adapted to be propelled against the vegetation, a revoluble sweep in a position to impinge against the seed-bearing portion of the vegetation in an upward direction, a shield overlying a lower sector of said sweep and a hood extending forward of said sweep spaced from said shield to provide a downwardly presented throat and adapted to bend the plants before they encounter said sweep; the plant-depressing portion of said hood being formed with a pocket shaped to receive and confine seed delivered by said sweep.

5. In a machine of the class described, a forwardly moving revoluble sweep adapted to encounter the seed-bearing portion of standing vegetation and moving upward with relation to the vegetation at such encountered portion, and a hood for said sweep providing seed-receiving pockets both forward and rearward thereof.

6. In a machine for harvesting seed from standing vegetation, a vehicle, a hood having a downwardly presented throat, a sweeper in said hood acting across said throat, a plant-depressing portion in advance of said throat, and means for mounting the hood upon the vehicle with vertical adjustment, comprising radius arms with means for supporting them at different angles to the vertical; the plant-depressing portion of the hood being vertically adjustable relatively to the sweeper.

7. In a machine for harvesting seed from standing vegetation, a vehicle, a hood, radius arms for mounting the hood upon the vehicle, and means for supporting said radius arms at different angles of adjustment; said hood having a downwardly presented throat and a sweeper acting across the throat, and being adjustable angularly to maintain the throat at proper presentation at different elevations of the hood.

8. In a machine for harvesting seed from standing vegetation, a hood having a downwardly presented throat, and a sweeper acting across said throat; said hood being divided into two sections angularly adjustable about the axis of the sweeper each section providing one wall of the throat.

9. In a machine for harvesting seed from standing vegetation, a hood having a downwardly presented throat, and a sweeper acting across said throat; said hood being divided into two sections angularly adjustable about the axis of the sweeper, each section providing one wall of the throat, and also adapted to change their spacing in the direction of travel.

10. In a machine for harvesting seed from standing vegetation, a vehicle, a hood mounted on said vehicle, and a sweeper mounted in said hood; said hood being constructed of two relatively adjustable shells spaced apart below to provide between them a downwardly presented throat adjacent to the sweeper and a seed receiving chamber across the throat from the sweeper and spaced apart at a point above the sweeper to provide a vent.

Signed at Chicago, Illinois, this 8 day of March, 1921.

SPENCER OTIS.
SPENCER OTIS, Jr.